United States Patent [19]

Boyd et al.

[11] 4,116,704
[45] Sep. 26, 1978

[54] COLORED GLASSWARE

[75] Inventors: David C. Boyd; James E. Flannery; David W. Morgan, all of Corning; Sara E. Rosplock, Campbell; Stella A. Sczerbaniewicz, Corning, all of N.Y.

[73] Assignee: Corning Glass Works, Corning, N.Y.

[21] Appl. No.: 875,200

[22] Filed: Feb. 6, 1978

Related U.S. Application Data

[63] Continuation-in-part of Ser. No. 809,325, Jun. 23, 1977, abandoned.

[51] Int. Cl.² .............................................. C03C 3/08
[52] U.S. Cl. ...................................................... 106/54
[58] Field of Search ........................................ 106/54

[56] References Cited

U.S. PATENT DOCUMENTS

| 2,035,318 | 3/1936 | Hood | 106/54 |
|---|---|---|---|
| 3,294,556 | 12/1966 | Harrington | 106/54 |
| 3,556,821 | 1/1971 | Hanzlik et al. | 106/54 |
| 3,907,586 | 9/1975 | Kiefer | 106/54 |
| 3,920,463 | 11/1975 | Simms | 106/54 |
| 3,984,252 | 10/1976 | Kiefer | 106/54 |

OTHER PUBLICATIONS

Volf, M. B., "Technical Glasses", Sir Issac Pitman & Sons, Ltd., London, 1961, pp. 129–156.

Primary Examiner—O. R. Vertiz
Assistant Examiner—Mark Bell
Attorney, Agent, or Firm—Clinton S. Janes, Jr.

[57] ABSTRACT

This invention is concerned with the production of transparent glass articles exhibiting an integral light gray-brown hue. More particularly, this invention is drawn to specific borosilicate-based glass compositions containing critically-defined amounts of $Co_3O_4$, NiO, and $MnO_2$ as colorants therefor. The resulting glasses exhibit a specifically-delineated transmittance curve in the visible portion of the radiation spectrum.

3 Claims, 9 Drawing Figures

COLORED GLASSWARE

This application is a continuation-in-part of application Ser. No. 809,325, filed June 23, 1977 now abandoned.

BACKGROUND OF THE INVENTION

The use of borosilicate glass for culinary ware is well-known to the art. Such glassware has been marketed under the trademark PYREX® for over 50 years. Most generally, the glassware has been marketed in the clear or "water white" state and decorating thereof accomplished through staining or the application of surface decorations thereto. Staining is a relatively slow, expensive process which is customarily employed to color small areas only of a glass article. Surface decorating of glass aticles has been widespread, the designs of such being essentially limitless. Staining of glass, commonly involving an ion exhange reaction in the glass surface, provides a reasonably permanent coloration to the glass since the ion exchange reaction results in ions penetrating and diffusing into the surface of the glass. In contrast, as the term suggests, surface decorations are simply that and, consequently, are subject to removal via chemical and mechanical abuse. This problem has been exacerbated through the increasing use of very hot water and strong detergents, such as are employed in home dishwashers.

The use of inorganic colorants to tint glass, i.e., to impart an integral color thereto, is well-recognized in the art. *Colured Glasses*, Woldemar A. Weyl, Dawson's of Pall Mall, London, 1959 is a standard text providing a survey of many ions which have that capability and suggesting mechanisms giving rise to the colors developed. An apparent advantage inherent in the use of such colorants is that the color produced becomes an integral part of the glass structure and, as such, is not subject to chemical attack and mechanical abuse.

Extensive consumer sampling had indicated that a clear glass having a gray-brown tint would be highly desirable in culinary ware. Target samples were prepared by spraying clear tinted lacquers of various colors and shades on borosilicate glass bodies. Glass compositions were then devised which visually matched the color of the target samples. Transmittance measurements were made on each glass. Consumer interviewing, utilizing articles formed from each glass composition in shapes conventional for culinary ware, determined that a clear glass having a light gray-brown color approximating the transmittance curve constituting appended FIGS. 6, 8, and 9 would be the most appealing.

SUMMARY OF THE INVENTION

We have found that a clear glass exhibiting a transmittance curve approximating that set forth in FIG. 6, FIG. 8, and FIG. 9 can be produced from a borosilicate-based glass having a composition consisting essentially, in parts by weight on the oxide basis, of about:

| | |
|---|---|
| $SiO_2$ | 78.0–80.0 |
| $B_2O_3$ | 14.16–12.35 |
| $Na_2O$ | 5.15–4.7 |
| $Al_2O_3$ | 2.21–2.0 |
| $Co_3O_4$ | 0.001–0.006 |
| NiO | 0.037–0.055 |
| $MnO_2$ | 0.6–0.21 |

Generally, the glass will be chloride fined through the addition of up to about 1% NaCl.

The $Ni^{+2}$ ion can be present in a glass structure in either a four-fold or six-fold coordination. The $Ni^{+2}$ ion in the four-fold coordination imparts a purple coloration, whereas the six-fold coordination results in a yellow coloration. It is therefore apparent that the coordination state of the $Ni^{+2}$ ion in vital in achieving the desired gray-brown tint in the glass.

We have discovered that the thermal treatment to which a NiO-containing glass is subjected influences the coordination state assumed by the $Ni^{+2}$ ions and, hence, the coloration developed within the glass. For example, we have found that when glass articles having compositions within the above base ranges are annealed, i.e., the articles shaped from the molten batch are cooled relatively slowly to room temperature, the $Ni^{+2}$ ions appear to adopt a six-fold coordination and, accordingly, provide a substantially yellow coloration to the glass. In contrast, when the molten batch is relatively quickly cooled to room temperature as, for example, when the glass article is thermally tempered, the $Ni^{+2}$ ions seemingly assume a four-fold coordination such that a predominantly purple coloration is imparted to the glass. Thus, $Ni^{+2}$ ions tend to be present in four-fold coordination at high temperatures and sudden cooling of the glass does not allow sufficient time for the conversion of the high temperature state of the $Ni^{+2}$ ions to six-fold coordination.

This change of coordination states is of extreme practical importance to the glass manufacturer since, particularly in the production of many consumer items, e.g., culinary ware, the process of tempering is frequently utilized. Consequently, to attain the same coloration as is demonstrated by the glass in the annealed state, the NiO level in a glass to be thermally tempered will be reduced somewhat with concurrent adjustments in the amounts of $Co_3O_4$ and $MnO_2$ employed. This practice is illustrated in Example 9, infra.

GENERAL DESCRIPTION OF THE INVENTION

The following TABLE reports the approximate compositions of a group of glasses, expressed in parts by weight on the oxide basis, illustrating the compositional parameters of the invention. The batch ingredients may comprise any materials, either the oxide or other compound, which, when melted together with the other batch constituents, will be converted to the desired oxide in the proper proportions. Because the sum of the individual components totals approximately 100, for all practical purposes each may be considered to be present in terms of weight percent.

Although the following description refers to laboratory scale melting only, it will be recognized that the tabulated compositions would also be operable in large-scale commercial melting equipment.

Batches for the exemplary compositions were compounded, the ingredients ballmilled together to assist in producing a homogeneous melt, and then deposited in platinum crucibles. After covering, the crucibles were moved to a furnace operating at about 1600° C. and the batches melted for about 4–6 hours with stirring. Thereafter, the melts were poured into steel molds to yield slabs about 6 × 6 inches × ½ inch and the slabs immediately transferred to an annealer operating at about 560° C.

The TABLE also records a description of the color tint present in each glass as viewed visually. The tint reported for Example 9 is that demonstrated after thermal tempering, whereas the other samples were simply annealed.

TABLE

|  | 1 | 2 | 3 | 4 | 5 | 6 | 7 | 8 | 9 |
|---|---|---|---|---|---|---|---|---|---|
| $SiO_2$ | 80.8 | 78.5 | 77.7 | 77.6 | 77.9 | 78.0 | 78.0 | 79.4 | 80.0 |
| $Na_2O$ | 5.0 | 5.03 | 5.03 | 5.03 | 5.03 | 5.03 | 5.03 | 4.7 | 5.15 |
| $B_2O_3$ | 14.2 | 14.16 | 14.16 | 14.16 | 14.16 | 14.16 | 14.16 | 12.9 | 12.35 |
| $Al_2O_3$ | 2.2 | 2.21 | 2.21 | 2.21 | 2.21 | 2.21 | 2.21 | 2.0 | 2.0 |
| NiO | 0.0118 | 0.0118 | 0.16 | 0.02 | 0.031 | 0.037 | — | 0.055 | 0.052 |
| $Co_3O_4$ | 0.005 | 0.0048 | — | — | 0.005 | 0.006 | — | 0.003 | 0.001 |
| CuO | 0.062 | 0.0595 | — | — | — | — | 0.12 | — | — |
| $TiO_2$ | — | — | 0.6 | — | — | — | 0.4 | — | — |
| $Fe_2O_3$ | — | — | 0.125 | 0.2 | — | — | — | — | — |
| $CeO_2$ | — | — | — | 0.81 | — | — | — | — | — |
| $MnO_2$ | — | — | — | — | 0.65 | 0.6 | — | 0.21 | 0.5 |
| $V_2O_5$ | — | — | — | — | — | — | 0.08 | — | — |
| Color | Light Gray | Very Light Gray | Red-Brown | Light Red-Brown | Gray-Brown | Light Gray-Brown | Light Green-Gold | Light Gray-Brown | Light Gray-Brown |

Figure 1:
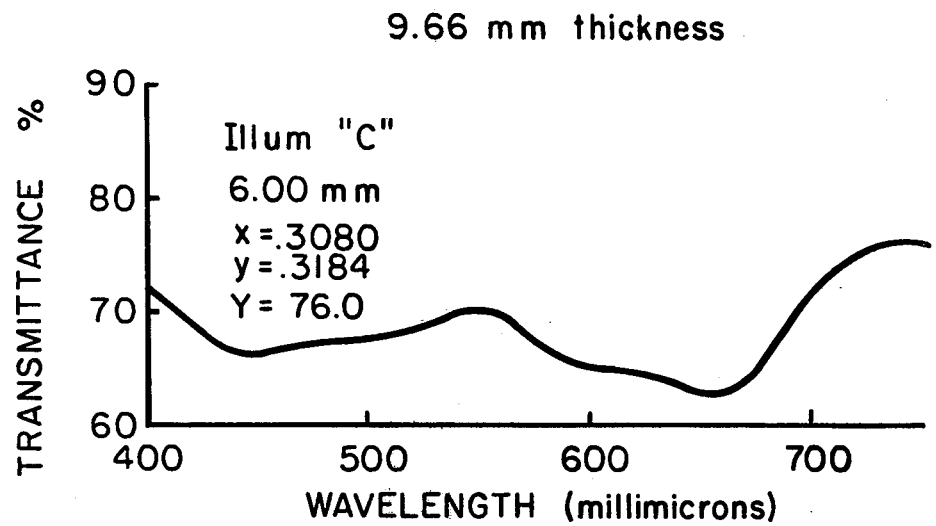
FIGS. 1–9 depict spectral transmittance curves demonstrated by polished plates of the exemplary compositions reported below.
Figure 2:
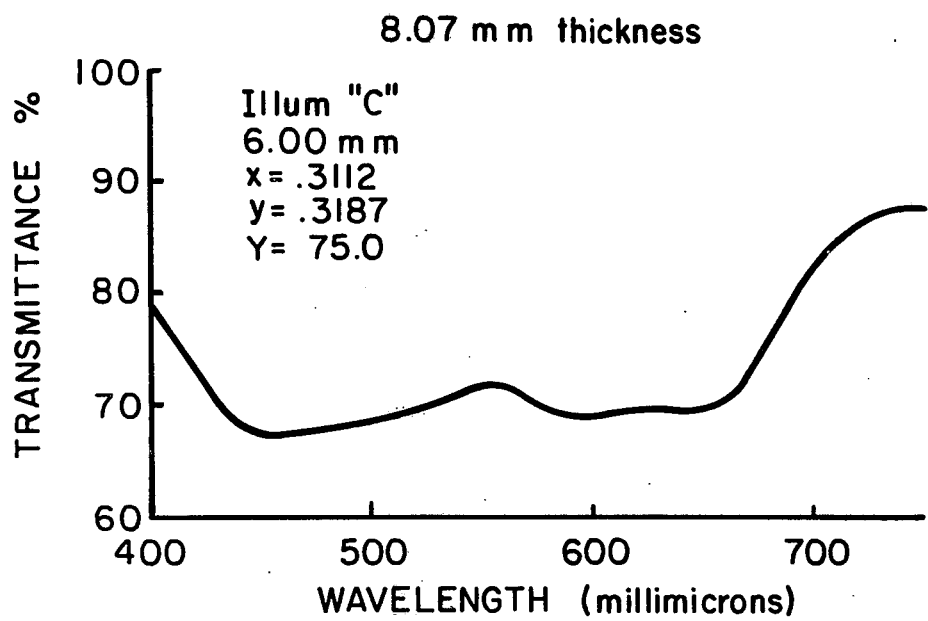
Figure 3:
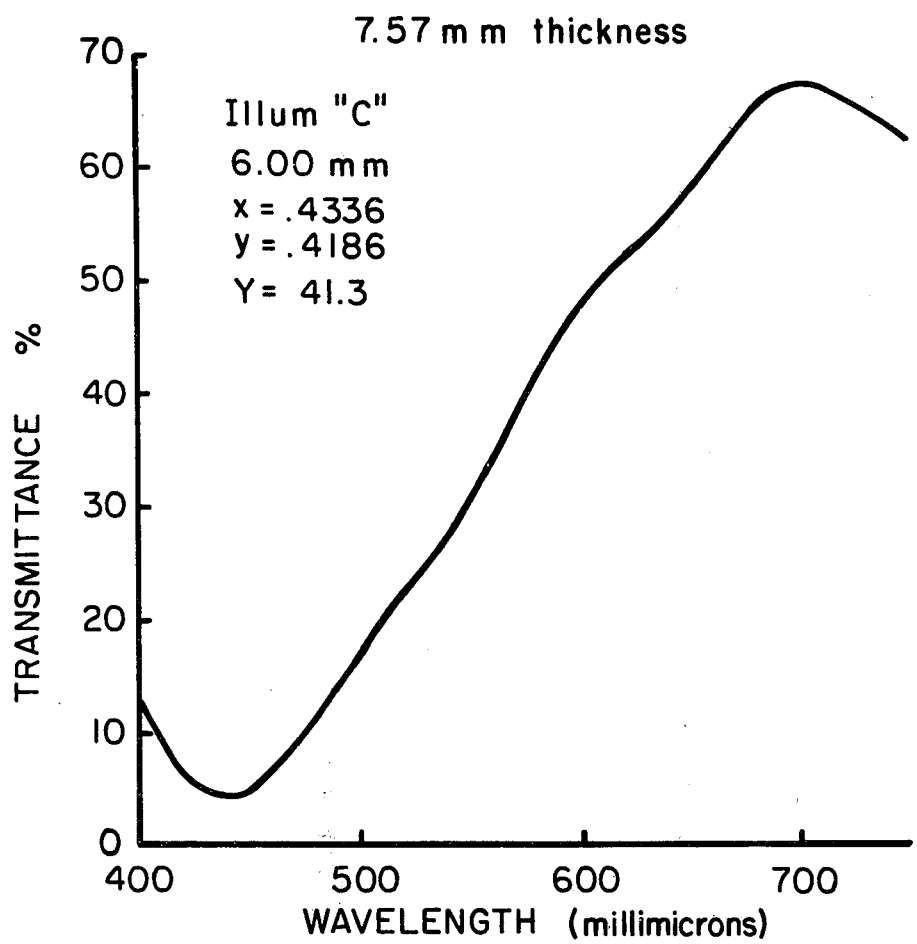
Figure 4:
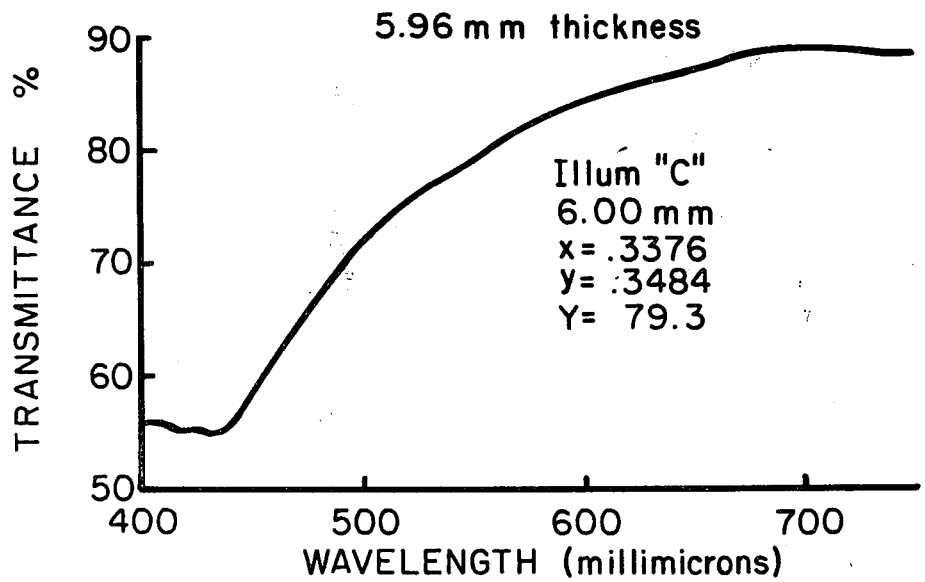
Figure 5:
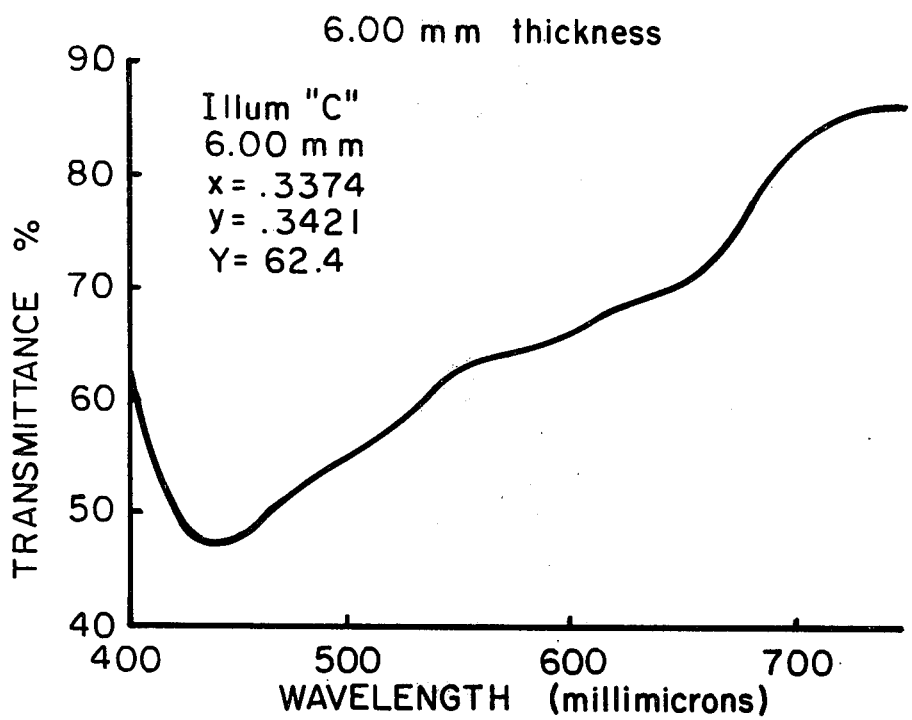
Figure 6:
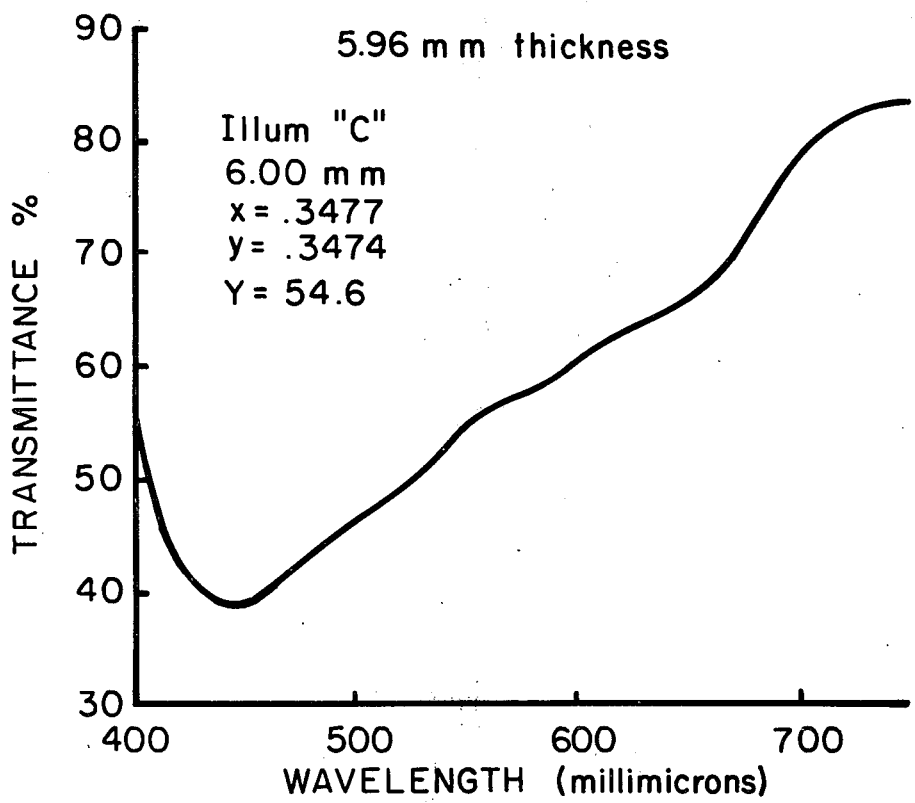
Figure 7:
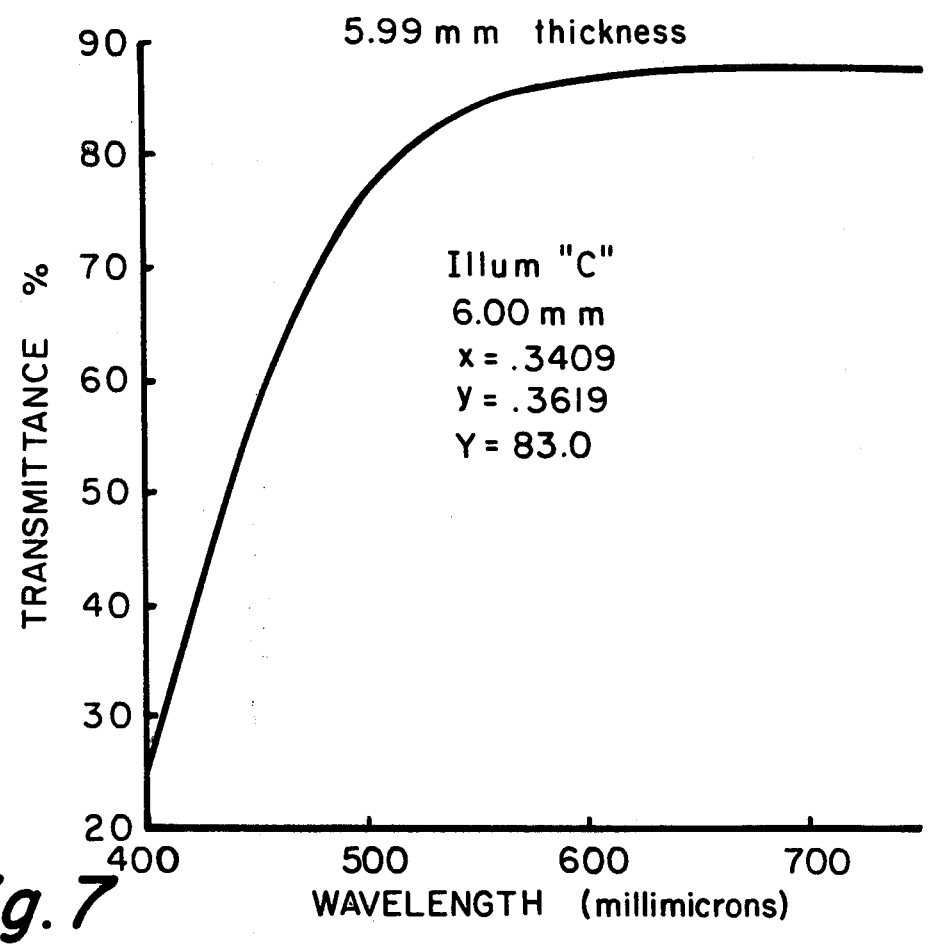
Figure 8:
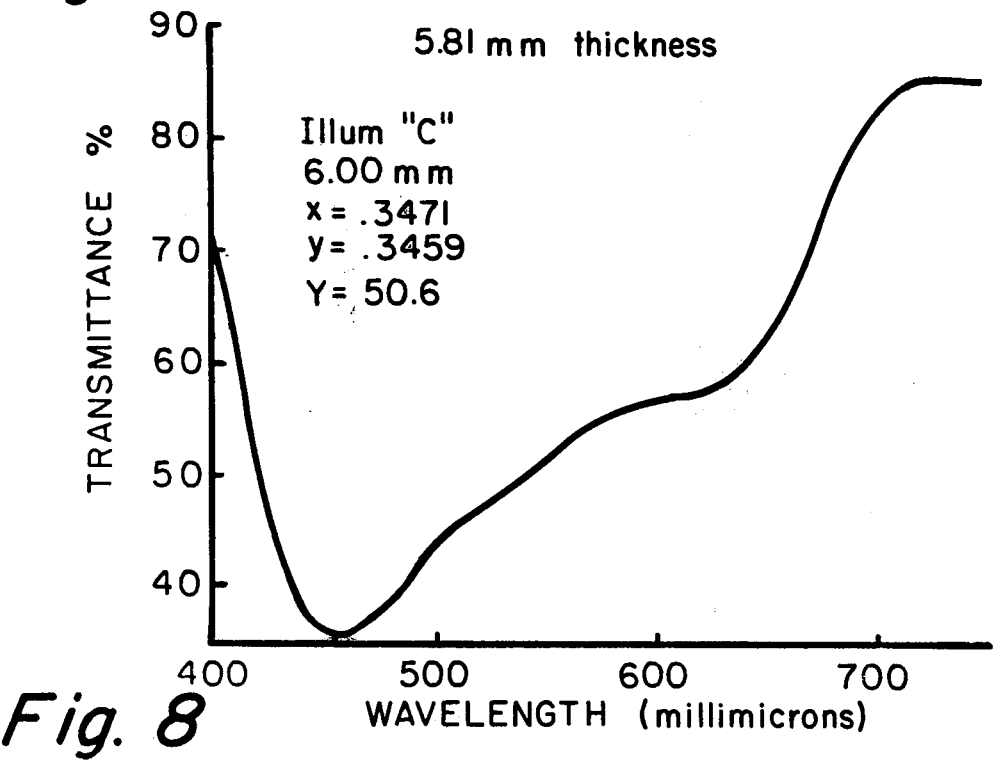
Figure 9:
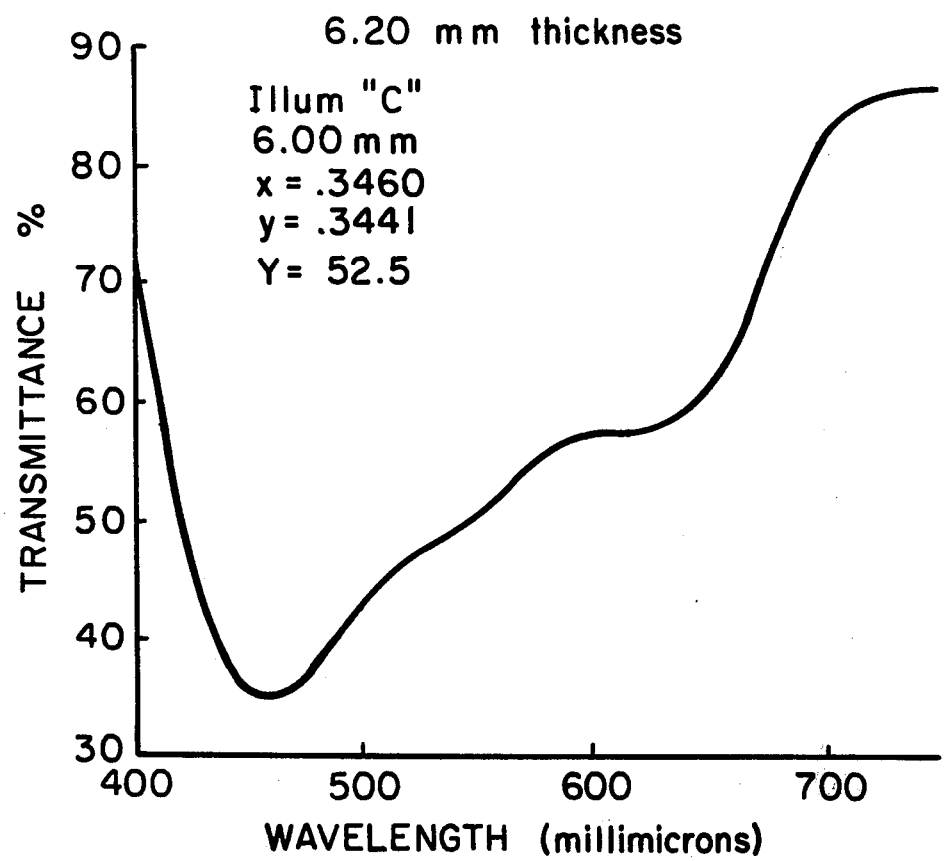

FIGS. 1–9 comprise spectral transmittance curves exhibited by polished plates of Examples 1–9, respectively, of the above TABLE utilizing a General Electric Company Recording Spectrophotometer No 732983. The thickness measurement of each plate is recorded at the top of each FIG. The values for x, y, and Y determined on each glass at 6 mm thickness using Illuminate C are also stated on each FIG. FIGS. 1–8 represent annealed samples whereas FIG. 9 represents the curve produced with a polished plate of Example 9 which has been thermally tempered.

A comparison of FIGS. 1–9 with exemplary compositions 1–9 clearly illustrates the extreme criticality of composition control. Thus, tints approaching that desired can be attained with colorants other than the combination of $Co_3O_4$, NiO, and $MnO_2$ and in a variety of base glass compositions. Nevertheless, the demanded color can only be achieved within the strictly restricted composition range delimited by Examples 6, 8, and 9 of the Table, viz., glasses consisting essentially, in parts by weight on the oxide basis, of about 4.7–5.15 $Na_2O$, 2–2.21 $Al_2O_3$, 12.35–14.16 $B_2O_3$, 78.0–80.0 $SiO_2$, 0.001–0.006 $Co_3O_4$, 0.037–0.055 NiO, and 0.21–0.6 $MnO_2$. Example 8 is deemed to be the preferred composition in terms of melting, forming, and batch cost where annealed ware is to be made. Example 9 is demonstrative of the need for adjusting the colorants where thermally tempered ware is to be produced. To achieve the most desired color in tempered ware, the composition of Example 9 will be maintained within the following ranges in parts by weight on the oxide basis:

| | |
|---|---|
| $Na_2O$ | 5.15 ± 0.1 |
| $B_2O_3$ | 12.35 ± 0.3 |
| $MnO_2$ | 0.5 ± 0.08 |
| NiO | 0.052 ± 0.002 |
| $Co_3O_4$ | 0.001 ± 0.0003 |
| $Al_2O_3$ | 2.0 ± 0.05 |
| $SiO_2$ | Balance |

We claim:

1. A clear, light gray-brown glass exhibiting a spectral transmittance curve approximating that set forth in FIG. 6, FIG. 8, and FIG. 9 having a composition consisting essentially, in parts by weight on the oxide basis, of about 4.7–5.15 $Na_2O$, 2–2.21 $Al_2O_3$, 12.35–14.16 $B_2O_3$, 78.0–80.0 $SiO_2$, 0.001–0.006 $Co_3O_4$, 0.037–0.055 NiO, and 0.21–0.6 $MnO_2$.

2. A clear, light gray-brown glass according to claim 1 consisting essentially, in parts by weight on the oxide basis, of about 4.7 $Na_2O$, 2.0 $Al_2O_3$, 12.9 $B_2O_3$, 79.4 $SiO_2$, 0.003 $Co_3O_4$, 0.055 NiO, and 0.21 $MnO_2$.

3. A clear, light gray-brown, thermally tempered glass according to claim 1 consisting essentially, in parts by weight on the oxide basis, of

| | |
|---|---|
| $Na_2O$ | 5.15 ± 0.1 |
| $B_2O_3$ | 12.35 ± 0.3 |
| $MnO_2$ | 0.5 ± 0.08 |
| NiO | 0.052 ± 0.002 |
| $Co_3O_4$ | 0.001 ± 0.0003 |
| $Al_2O_3$ | 2.0 ± 0.05 |
| $SiO_2$ | Balance |

* * * * *